(12) United States Patent
Muhlhoff

(10) Patent No.: US 6,892,777 B2
(45) Date of Patent: May 17, 2005

(54) RIM WITH SEATS INCLINED OUTWARDS AND ASSEMBLIES COMPRISING SUCH A RIM AND AN INFLATED BEARING SUPPORT

(75) Inventor: Olivier Muhlhoff, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 15 days.

(21) Appl. No.: 10/211,655

(22) Filed: Aug. 2, 2002

(65) Prior Publication Data

US 2003/0025384 A1 Feb. 6, 2003

Related U.S. Application Data

(63) Continuation of application No. PCT/EP01/02077, filed on Feb. 23, 2001.

(30) Foreign Application Priority Data

Feb. 28, 2000 (FR) .............................................. 00 02585

(51) Int. Cl.⁷ ........................ B60C 25/00; B60C 17/00; B60C 17/02; B60C 5/16
(52) U.S. Cl. ...................... 152/400; 152/516; 152/520; 152/381.4
(58) Field of Search .......... 301/95.101, 95.104–95.107, 301/95.109; 152/378 R, 379.3, 379.4–379.5, 380, 381.3, 381.4, 382, 383, DIG. 9, 375, 516, 520, 400

(56) References Cited

U.S. PATENT DOCUMENTS

| 506,424 A | * 10/1893 | Ducasble .................... 152/327 |
| 5,082,041 A | 1/1992 | Shiozawa et al. |
| 5,139,067 A | 8/1992 | Shiozawa et al. |
| 5,232,033 A | 8/1993 | Durif |
| 5,634,993 A | 6/1997 | Drieux et al. |
| 5,749,982 A | * 5/1998 | Muhlhoff et al. ........... 152/158 |
| 5,785,781 A | 7/1998 | Drieux et al. |
| 5,787,950 A | 8/1998 | Muhlhoff et al. |
| 6,035,913 A | * 3/2000 | Bapt et al. ................ 152/381.4 |
| 6,092,575 A | 7/2000 | Drieux et al. |
| 6,283,185 B1 | 9/2001 | Rivaton |
| 6,415,839 B1 | * 7/2002 | Pompier et al. ......... 152/381.4 |
| 6,418,992 B1 | 7/2002 | Drieux et al. |
| 6,679,306 B2 | * 1/2004 | Steinke ........................ 152/520 |
| 6,705,368 B2 | * 3/2004 | Glinz et al. ................. 152/400 |

FOREIGN PATENT DOCUMENTS

| EP | 0377338 | 7/1990 |
| EP | 0445963 | 9/1991 |
| FR | 2149274 | 3/1973 |
| FR | 2699121 | 6/1994 |
| FR | 2713557 | 6/1995 |
| FR | 2756221 | 5/1998 |

OTHER PUBLICATIONS

US 2003/0000618 A1 (Clouet) Jan. 2, 2003, entire document.*

* cited by examiner

Primary Examiner—Russell D. Stormer
Assistant Examiner—Jason R. Bellinger
(74) Attorney, Agent, or Firm—Baker Botts L.L.P.

(57) ABSTRACT

Mounting rim designed to form a rolling assembly with a tire and an inflatable and inflated tread bearing support, and comprising on each side of the equatorial plane a rim seat inclined outwards and extended axially outwards by a projection or hump, characterized in that it comprises, axially towards the inside between each rim seat for the tire beads and the equatorial plane XX', at least one truncated conical seat inclined inwards and designed to receive a bead of a tire tread bearing support. The rolling assembly is used either with a bearing support in the form of a toric membrane inflated hard which retains its shape and pressure if the tire is punctured, or with a bearing support in the form of a membrane that can expand in the event of a tire puncture and entirely fill the internal cavity of the tire.

17 Claims, 5 Drawing Sheets

RIM WITH SEATS INCLINED OUTWARDS AND ASSEMBLIES COMPRISING SUCH A RIM AND AN INFLATED BEARING SUPPORT

CROSS-REFERENCE TO RELATED APPLICATIONS

This application is a continuation under 35 U.S.C. § 120 of international application Serial No. PCT/EP01/02077, filed Feb. 23, 2001 and published as WO 01/64459 on Sep. 7, 2001 in French, which further claims priority under 35 U.S.C. §119 of French application Serial No. 00/02585 filed Feb. 28, 2000.

BACKGROUND OF THE INVENTION

The present invention concerns an assembly formed by a wheel rim and an inflatable tire tread bearing support inflated to a given pressure, the said assembly, together with a tire, forming a rolling assembly that can allow the said tire to roll when its pressure is low or even zero. The said rim, designed for the mounting of the tire, is more particularly a rim with at least one rim seat inclined towards the outside.

U.S. Pat. No. 6,092,575 describes a wheel rim of the type mentioned above. It comprises at least a first truncated conical rim seat whose generatrix has an axially external end on a circle with diameter smaller than the diameter of the circle on which the axially internal end of the said generatrix is located. The truncated conical seat is extended axially outwards by a projection or hump whose outside diameter is smaller than the diameter of the axially internal end of the rim seat's generatrix. In the preferred shape of the rim, the said first rim seat is extended axially inwards by a bearing surface designed to receive a support ring for the tread, which is deformable and can be pushed over the said surface. Limited axially by a rim stop designed to keep the bearing support in its axial position, the said bearing surface is extended by a mounting groove which is needed to enable the tire beads to be positioned on the rim. The rim is completed by the addition of a second rim seat also inclined outwards and extended axially on the inside by a projection and axially inwards by a flange that connects to the mounting groove.

The tire tread bearing support generally used with the rim described above is a bulky, rigid support made of an elastomeric or plastic material. Besides, it is heavy despite the numerous cavities between its base and its crown. However, supports for rolling at low or zero tire pressure should be as light as possible, they should have as high a load-bearing capacity as possible without affecting their lightness, and should allow the driver of a vehicle fitted with them to control his vehicle despite the loss of pressure, more especially if the said loss takes place when the tire is rolling under the action of drift stresses.

SUMMARY OF THE INVENTION

To achieve the above objectives, the invention proposes a wheel rim of the type described above, but adapted to receive a tire bearing support in the form of a toric membrane, a support which with the said rim and tire forms an assembly that is easy to mount and remove. Accordingly, the mounting rim, which is designed to form a rolling assembly with a tire and an inflatable and inflated tread bearing support and which comprises on each side of the equatorial plane a rim seat inclined axially outwardly and radially inwardly and extended radially outwardly by a projection or hump, is characterized in that it comprises, axially towards the inside between each rim seat for a tire bead and the equatorial plane XX', at least one truncated conical seat inclined inwards and designed to receive a bead of a bearing support for the tire tread.

A truncated conical seat for a bearing support bead is said to be inclined inwards when, in a manner similar to a rim seat for a tire bead, its axially inner end is a circle of diameter smaller than the diameter of the axially outer end, which is the largest diameter and by convention the diameter of the seat. A truncated conical seat for a bearing support is a seat whose generatrix makes an angle between 0° and 20° inclusive relative to a line parallel to the rotation axis, and a cylindrical seat is regarded as a special case of a truncated conical seat.

The two seats on either side of the equatorial plane designed to receive the tire beads may have equal diameters: the rim in question is then said to be symmetrical and comprises at least one mounting groove arranged axially between the seats for the beads of the bearing support. The space required for the fitting and functioning of the internal mechanical parts on the wheel can be advantageously increased by reducing the depth of the mounting groove or dispensing with it entirely, the said reduction or suppression going together with the use of a rim in which the respective diameters of the two tire bead seats are unequal: such a rim is termed asymmetrical and may or may not comprise a mounting groove located axially between the two seats for the bearing support beads. Whether the tire bead seats are equal or unequal, the bearing support bead seats can also be equal or unequal. To facilitate mounting of the assembly, it is advantageous for the inequality of the tire bead seats to be associated with an inequality between the bearing support bead seats, this inequality being in the same direction and of the same size.

The two seats on the same side of the rim, the seats respectively intended to receive one tire bead and one tire bearing support bead, may be axially adjacent and their diameters are then equal. The said two seats are preferably joined by a truncated conical portion whose generatrix, relative to a line parallel to the rotation axis, makes an angle of between 35° and 55° open radially towards the outside and axially towards the inside. The said truncated conical portion is advantageously extended axially by a cylindrical portion, these two portions serving as connection elements between the two truncated conical seats.

In the above-preferred variants, the diameter of the bearing support bead seat is either equal to or larger than the diameter of the tire bead seat. The diameter of the bearing support bead seat may be smaller than the diameter of the tire bead seat. In that case the generatrix of the cylindrical portion is axially connected to the generatrix of the bearing support bead seat by a straight line segment either perpendicular to the rotation axis of the assembly, or inclined relative to the direction parallel to the rotation axis by an angle that may be between 60° and 90°, the bearing support bead seat then being directly connected to the bottom of the rim groove, or to the bottom of the rim or to a mounting groove for the bearing support. The solution described allows the support structure to be inflated to a higher pressure.

Whether the rim considered is symmetrical or asymmetrical, the mounting of the bearing support beads is greatly facilitated if the bearing support bead seat is extended in a manner juxtaposed to and axially towards the inside by a truncated conical portion whose generatrix, relative to a line parallel to the rotation axis, makes an angle of between 20° and 50° open radially towards the inside and axially towards the inside, the said truncated conical portion being connected either to the bottom of the rim in the case of a rim with no mounting groove, or to the vertical wall of a groove, or to the bottom of the groove itself, in the case of a rim with a groove.

The tread bearing support may be a toric membrane inflated to a given pressure and provided with a cap radially covering a crown reinforcement, the said cap being connected via two sidewalls to two beads, each bead being reinforced by an annular element to ensure that the bearing support bead is tight enough on the rim seat. At its crown the said membrane may be reinforced by a hoop reinforcement consisting at least of circumferential reinforcement elements, which may or may not be practically inextensible. It may also be reinforced at its crown by a highly extensible reinforcement armature whose reinforcement elements are designed to break under a given tension higher than the sum of the tension produced by the centrifugal force to which it may be subjected and the tension produced by a difference of internal pressures between the pneumatic cavity of the membrane and the pneumatic cavity located between the membrane and the inside of the tire, as described for example in patent FR 2 756 221, to which reference is made. In the latter case, and if pressure is lost in the cavity between the membrane and the inside of the tire, the membrane expands circumferentially to fill the inside space initially occupied by the tire. In the aforementioned crown variants, the bearing support advantageously comprises a tread or cap made from a rubber mix, whose thickness can vary depending on the uses envisaged, and the said tread can be provided with profiling elements such as grooves, ribs or rubber blocks. The support tread is connected to the beads of the said support by sidewalls preferably formed exclusively of one (or more) layer(s) of rubber mix(es), the sidewall thickness being radially variable such that the layer(s) adapt perfectly to the contour of the tire's sidewalls and beads after a loss of pressure. The said bearing support beads are provided with a circular reinforcement ring which is circumferentially inextensible.

The said support membrane may be open or closed. If it is open, it may be pressurized either directly (when its internal lining will be impermeable to the inflation gases customarily used) or it may be pressurized via an air chamber impermeable to the said gases. If it is closed, it takes the form of a tube provided with a suitable inflation means, which may be integral with the means for inflating the cavity between the membrane and the inside of the tire, or completely separate from the said means.

BRIEF DESCRIPTION OF THE DRAWINGS

The characteristics of the invention will be better understood with the help of the description below, which refers to the drawing illustrating example embodiments in a non-limiting way and which shows.

DETAILED DESCRIPTION OF PREFERRED EMBODIMENTS

Figure 1:
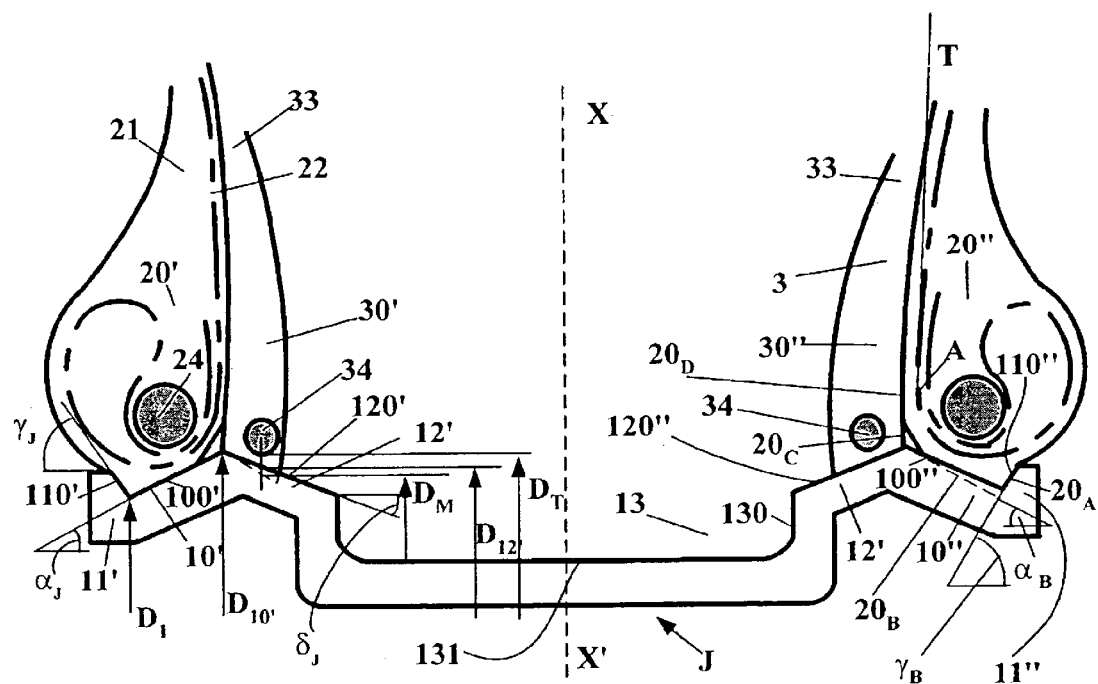
FIG. 1: Schematic representation of a simplified variant of the assembly according to the invention

In FIG. 1, the rim J, according to the invention, comprises a first rim seat 10' for the first tire bead 20' and a second seat 10" for the second bead 20". The seat 10' is a truncated conical surface whose generatrix 100' has its axially external end (relative to the equatorial plane XX' of the rim) on a circle of diameter $D_1$ smaller than the diameter $D_{10}$, of the circle on which the axially internal end is located (the larger diameter $D_{10}$ being conventionally taken as the diameter of the seat); the said seat 10' is said to be inclined outwards and its generatrix 100', relative to a line parallel to the rim's rotation axis, makes an angle $\alpha_j$ which may be between 0° and 30° but which, in the example described, is equal to 20°. The generatrix 100' is extended axially outwards by the generatrix 110' of the essentially truncated conical, axially interior wall of a projection or hump 11' that forms the edge of the rim J, where "essentially truncated conical" means that the generatrix 110' of the said wall can be a straight line segment but also an arc of a very slightly in-curving circle with its concavity facing inwards. The said generatrix 110' or the cord subtending it, relative to a line parallel to the rotation axis, makes an angle $\gamma_j$ which is open axially and radially towards the outside and is equal to 45°, but which can be between 40° and 50°. The seat 10' is adjacent to and extended axially inwards by a first rim seat 12' for a bearing support bead 30', and in the case described the said truncated conical seat has a generatrix 120' which, relative to a line parallel to the rotation axis, makes an angle $\delta_j$ which may be between 0° and 20° but is equal to 10° in the example considered. The generatrices 100", 110" and 120", respectively of the second seat 10", the projection 11" and the seat 12" on the other side of the equatorial plane, are symmetrical to the generatrices 100', 110' and 120' with respect to the said plane. A groove 13, which serves for the mounting on the one hand of the tire and on the other hand of the bearing support, and whose depth is calculated accordingly, completes the rim J. The two lateral walls 130 of the groove J connect the seats 120' and 120" and the bottom of the groove J 131.

As described in U.S. Pat. No. 6,092,575, the tire to be mounted on the rim J comprises a tread connected by two sidewalls 21 to two beads 20' and 20". The said tire is reinforced by a radial carcass reinforcement 22 anchored in each bead 20' (20") by being turned up around a bead wire 24, which in the example shown is a bead wire of the "braided" type. The carcass reinforcement 22 is tangential to the bead wire 24 at a point A, through which a line parallel to the rotation axis can pass. At this point A the tangent AT to the meridian point of the carcass reinforcement 22 makes relative to the said line an angle of 85° which is open towards the outside. Each bead 20' (20"), whose axial width is comparable to the known and usual tire bead widths, has an external contour mainly formed of a bead toe whose outer face 20A makes relative to the rotation axis an angle $\gamma_B$ of 60°±10° which is open radially and axially towards the outside, and the said face 20A is extended radially inwards by a bead seat with a truncated conical base 20B which, relative to the rotation axis, makes an angle $\alpha_B$ between 10° and 45° which is open axially towards the inside and radially towards the outside, the angle $\alpha_B$ being larger than the angle $\alpha_j$, which is the angle of the seat of the rim 10', by an amount between 3° and 15°. The seat 20B is extended axially inwards by a truncated conical generatrix 20C corresponding to the bead hook which, relative to the rotation axis, makes an angle $\beta_B$ of 45°±10° which is open axially towards the inside and radially outwards, and is extended on the inside by a wall 20D essentially perpendicular to the rotation axis.

Figure 7:
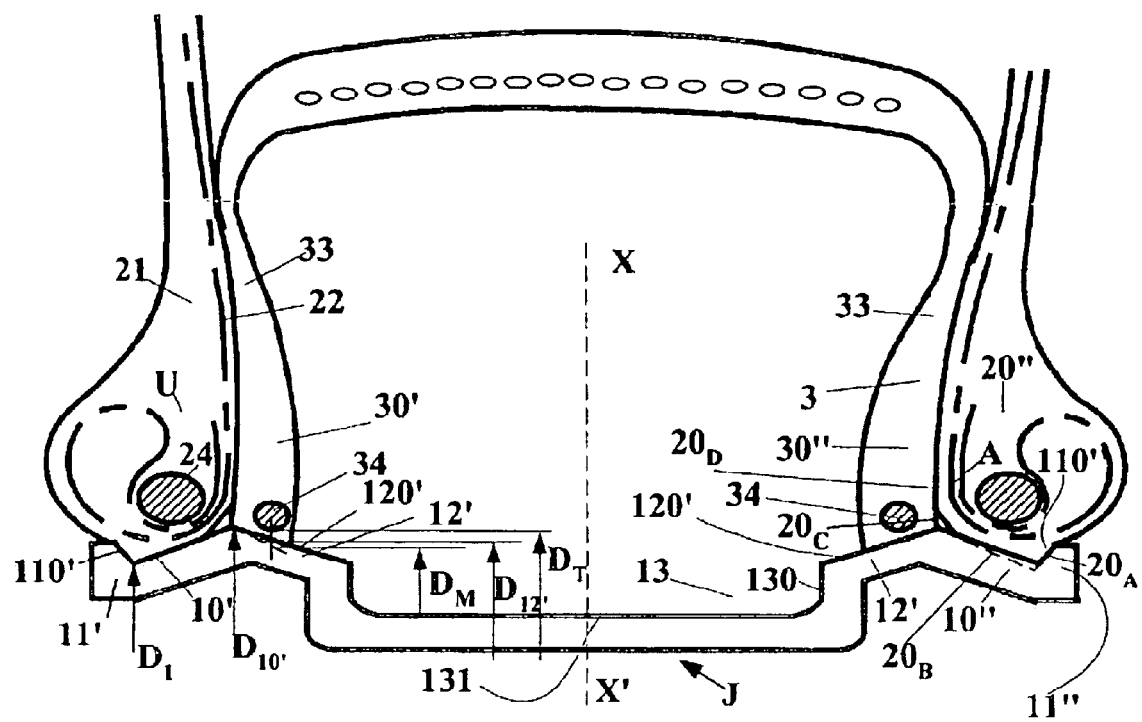
FIG. 7: Schematic representation of an additional view of FIG. 1 distant from the said rotation axis, the width being essentially equal to the axial width of the inside of the tire at its service pressure.

The bearing support 3 for the tread is a rubber membrane impermeable to the usual inflation gases, comprising a cap which radially covers a crown reinforcement as depicted in FIG. 7. The said cap is connected via two support sidewalls 33 to two beads 30' and 30". Depending on the intended use of the tire of the rolling assembly, the crown reinforcement of the support cap may be of two kinds:

For a tire intended to roll rapidly over various types of ground, in particular for an off-road vehicle, a touring vehicle or a van, inflated to a relatively low service pressure (for example a pressure of 1 to 2 bar), the crown reinforcement (not shown) is made circumferentially inextensible by using at least one ply of circumferential, quasi-inextensible reinforcement elements, that is to say, ones which relative to the circumferential direction make an angle of 0°0±2.5°; the membrane is used with an inflation pressure much higher than that of the tire, between 2 and 5 times the service pressure thereof, and the said membrane retains its shape and pressure when the tire is punctured with partial or total loss of pressure. The reinforcement elements are cables of aromatic polyamide, and the ply or plies has/have width(s) greater than the width of the cap when measured along a line parallel to the rotation axis and tangential to the meridian profile of the cap at its point most distant form the said rotation axis, the width being essentially equal to the axial width of the inside of the tire at its service pressure.

For a road tire of the usual kind intended to roll at usual speeds on roads and/or motorways, and inflated to a service pressure generally between 1.5 and 3.0 bar, the reinforcement armature is such that under the action of the difference between the respective internal pressures of the membrane 3 and the tire (the internal membrane pressure being higher than the tire's normal rolling pressure by about 1 bar), it is almost inextensible, but under the action of a difference substantially increased by a pressure loss of the tire, it becomes extensible so that the circumferential size of its cap becomes at least equal to the circumferential size of the tire inside. The said reinforcement is advantageously formed of at least one ply of reinforcement elements having a two-section force-elongation curve with different slopes: a first section from the origin to a certain elongation point $\epsilon_O$ with a steep slope, and a second section from the said elongation point $\epsilon_O$ to the elongation $\epsilon_R$ at rupture with a very shallow slope. As known in their own right, such reinforcement elements may be cables with a particularly strong core around which are twisted filaments or strands with a small twist pitch, cables such as those described for example in published U.S. Application No. 20010035247.

Referring to FIGS. 1 and 7, a sidewall 33 of the bearing support preferably consists of a single rubber layer of small thickness reinforced by an armature of at most two plies, the cables forming the said ply or plies being made of textile and being radial or angled relative to the circumferential direction. The said sidewall ends in a bead 30'(30") thicker than the sidewall 33, reinforced by an inextensible annular element 34 which may be a bead wire, that is to say formed of a wire or cable wound round several times or several circumferential wires or cables braided together, or a wound strip. The said reinforcement element 34 has an inside diameter DT which ensures a certain tightness on the rim seat 12'(12") for the bearing support bead, that is to say, a certain radial compression of the rubber layer between the element 34 and the base of the said bead 30'(30"). The tightness s is the ratio $D_{12'} - D_M / 2(D_T - D_M)$, where the quantities $D_{12'}$, $D_M$ and $D_T$ are the respective diameters of the rim seat 12', the base of the support bead not mounted on the rim, and the reinforcement element 34. The said diameters are measured along a line perpendicular to the rotation axis and passing through the center of gravity of the meridian section of the element 34. The tightness s must ensure air-tightness and positional stability of the bearing support under any rolling conditions, to avoid the appearance of any vibrations.

Figure 2:
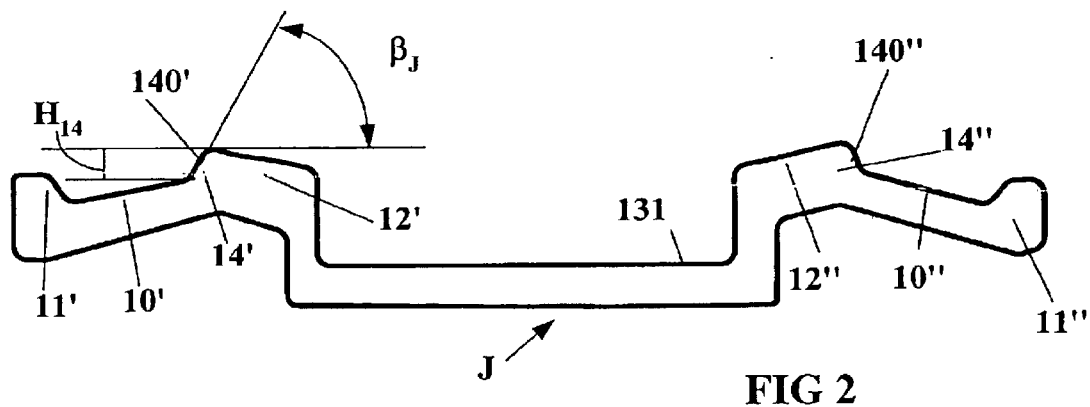
FIG. 2: Similar representation of a second variant in accordance with the invention

In the first variant described above the beads 30' and 30" of the tread support membrane serve to block the beads of the tire mounted on its service rim. The lateral forces acting on such beads when the rolling assembly is required to roll with zero tire pressure and under conditions of pronounced drift are high, and the variant shown in FIG. 2 gives maximum efficacy against displacement of the tire and bearing support off the rim. The said variant differs from that illustrated in FIG. 1 by the addition, between the truncated conical rim seat 10' (10") for the tire bead 20' (20") and the rim seat 12' (12") for the bead 30' (30") of the bearing support 3, of a truncated conical portion 14' (14") whose generatrix 140' (140") makes with a line parallel to the rotation axis an angle $\beta_j$ which is open axially towards the inside and radially towards the outside, the said angle being between 35° and 55° and equal to 45° in the case of FIG. 2. The height $h_{14}$ of this rim stop 14', measured between the axially inner end of the seat 10' and the axially outer end of the seat 12', is equal to 3.5 mm and in any case between 2 and 6 mm.

Figure 3:
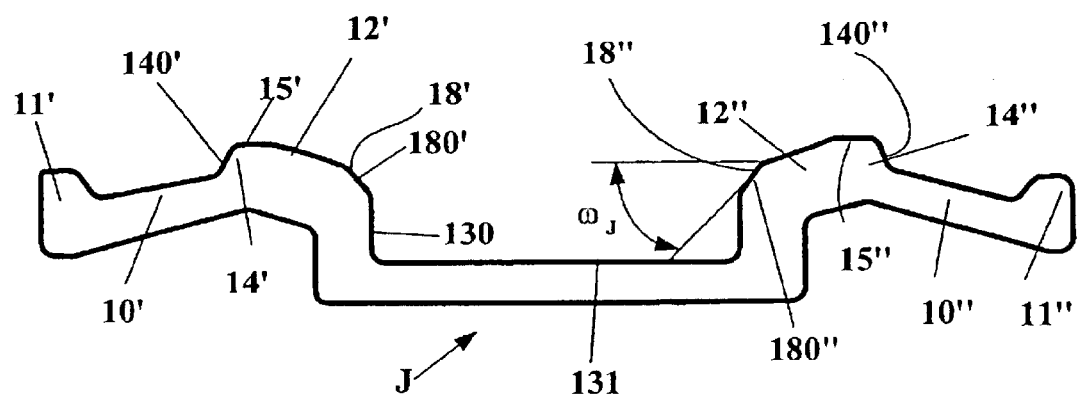
FIG. 3: Variant with a cylindrical portion in accordance with the invention

The variant illustrated in FIG. 3 consists in arranging between the truncated conical portion 14' (14") described above and the rim seat 12' (12") for the support bead, when the latter is truncated, a portion 15' (15") whose generatrix 150' (150") can be a straight line segment parallel to the rotation axis or an arc of a circle centered on a line parallel to the rotation axis. The said generatrix may have a relatively small axial width, but one sufficient to allow an inflation valve to be positioned if necessary for the pressurization of the tire. It may also have a large width on one side and/or on the other side of the assembly, to allow the use of a tread bearing support whose maximum axial width is smaller than the maximum axial width of the tire. FIG. 3 also shows the variant in which the seat 12' (12") is extended axially inwards by a truncated conical portion 18' (18") whose generatrix 180' (180"), relative to a line parallel to the rotation axis, makes an angle of $\omega_j$ larger than the angle $\delta_j$. In the case considered the said angle $\omega_j$ is equal to 45°, which facilitates the positioning of the bearing support bead.

Figure 4:
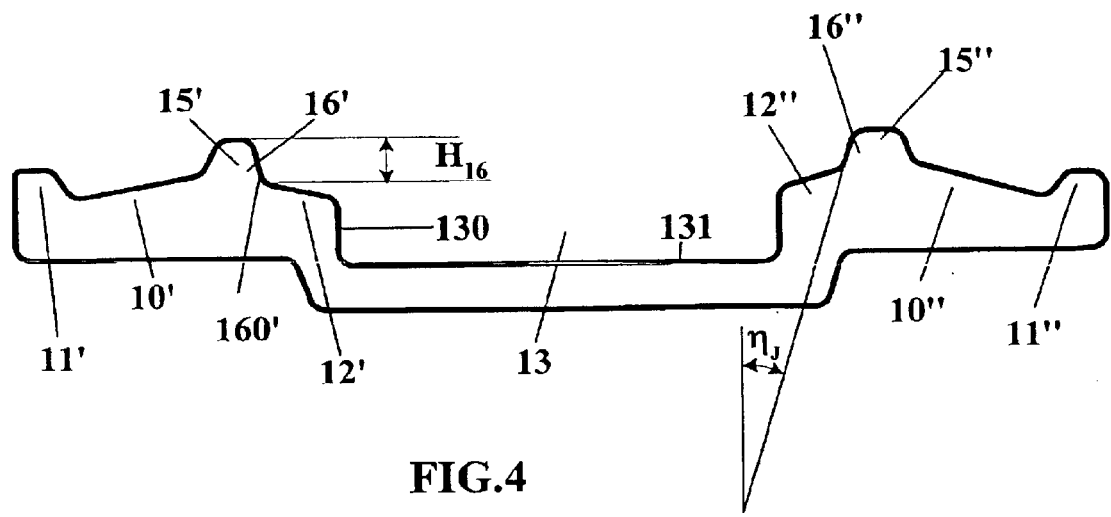
FIGS. 4 and 5: Two variants, with different diameters of the seats respectively for the tire bead and the support bead in accordance with the invention
Figure 5:
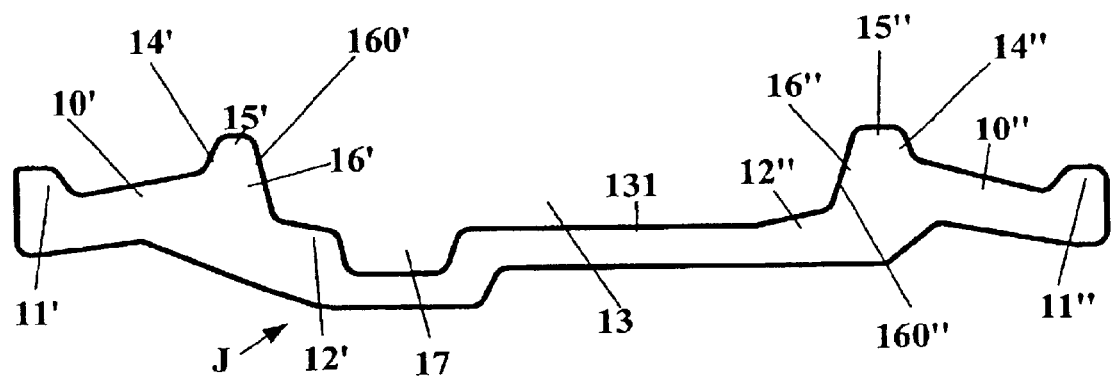

The said cylindrical portion 15'(15") can be connected directly to the bearing support seat 12' (12") (FIG. 3). To create a proper rim flange for the support bead, a flange required when the bearing support is used under very high pressure to avoid axial outward displacement of the tire bead during mounting, the cylindrical portion 15' (15") is connected to the seat 12' (12") by a portion 16' (16") whose generatrix 160' (160"), relative to the trace of a plane parallel to the equatorial plane, makes an angle $\eta_j$ which is radially and axially open towards the outside and is between 0° and 20°, the value 0° being included in the range. The said portion 16' (16") may have a height $H_{16}$ between 2 and 15 mm (FIG. 4), depending on how firmly it is desired to keep the said support bead in place. When the said height is relatively large, and in the case when the portion 16' (16") consists of the walls of the groove 13, a second mounting groove 17 must be provided for the easy and correct mounting of the support beads (FIG. 5).

Figure 6:
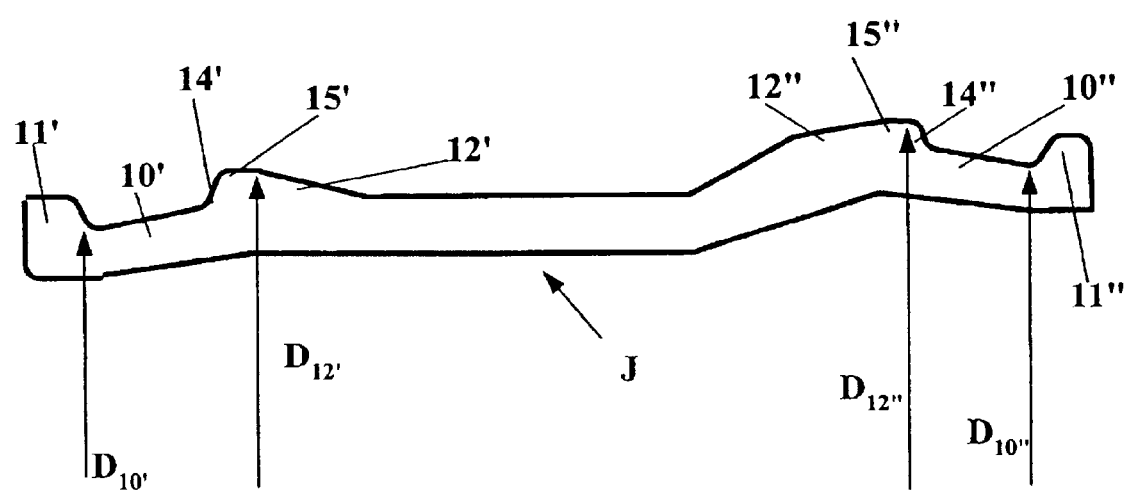
FIG. 6: Schematic representation of an asymmetrical rim variant in accordance with the invention

In all the variants described so far a mounting groove was needed, at least for mounting the tire bead 20" onto its seat 10", since the mounting operation requires the said bead to be outside the rim before being positioned on the seat. It is well known that the presence of mounting grooves is not an ideal solution for designers of vehicles that roll on tires, because it greatly reduces the space available inside the rim. As is already known as such, the depth of the mounting groove(s) can be made smaller by making the rim asymmetrical, due to the fact that the diameters of the tire bead seats and those of the bearing support bead seats are unequal. FIG. 6 illustrates such an example, where the asymmetry is such that the rim J has no groove at all. Compared with the rim shown in FIG. 3, the rim of FIG. 5 has tire bead rim seats 10' and 10" having diameters $D_{10'}$ and $D_{10"}$ which differ by an amount equal to 0.045 $D_{10"}$, while the diameters $D_{12'}$ and $D_{12"}$ of the rim seats for the support beads differ by the same amount.

Simultaneous asymmetry of the rim seats for the tire beads and the support beads is the solution that allows the easiest possible mounting of the assembly, but it does not go beyond the scope of the invention if the asymmetry involves only the rim seats for the support beads.

I claim:

1. A mounting rim designed to form a rolling assembly with a tire having a pair of beads and an inflated tread bearing support having at least two beads, and comprising on each side of the equatorial plane of the rim a rim seat, for receipt of one of said tire beads, inclined axially outwardly and radially inwardly and extended axially outwards by a projection or hump, wherein the rim further comprises on each side of the equatorial plane, axially inwardly between each tire bead rim seat and the equatorial plane, at least one truncated conical seat inclined inwards at an angle greater than 0° with a line parallel to the axis of rotation and designed to receive a bead of the tread-bearing support.

2. The rim according to claim 1, wherein each rim seat has a generatrix which makes-with forms a line parallel to the rotation axis an angle ($\delta_j$) greater than 0° and less than or equal to 200.

3. The rim according to claim 2, wherein the rim seats for the tire beads have equal diameters, and wherein at least one mounting groove, having lateral walls, is arranged between the seats for the beads of the tread-bearing support.

4. The rim according to claim 3, wherein the rim seat and the at least one conical seat located on the same side of the equatorial plane of the rim are axially adjacent and have equal diameters.

5. The rim according to claim 3, wherein the rim seat and the at least one conical seat on the same side of the equatorial plane are connected by a truncated conical portion, whose generatrix, relative to a line parallel to the rotation axis, makes an angle ($B_j$) of between 35° and 55° which opens radially outwardly and axially inwards.

6. The rim according to claim 5, wherein said truncated conical portion is extended axially, inwardly by a cylindrical portion, and said truncated conical portion and said cylindrical portion serve to connect the two truncated conical seats.

7. The rim according to claim 5, wherein the seats for the beads of the bearing support are axially extended inwardly by the lateral walls of the mounting groove of the rim.

8. The rim according to claim 6, wherein the seats for the beads of the tread-bearing support are of a diameter smaller than the diameter of the seats for the tire beads, and the cylindrical portion is axially connected to the seat for the bead of the tread-bearing support by a truncated conical portion whose generatrix, relative to the trace of a plane parallel to the equatorial plane, makes an angle ($n_j$) greater than 0° and less than or equal to 200.

9. The rim according to claim 8, wherein the seats for the tread-bearing beads of the bearing support are axially extended inwardly by the lateral walls of the mounting groove of the rim.

10. The rim according to claim 8, wherein the seats for the beads of the tread-bearing bearing support are directly connected to the bottom of the mounting groove of the rim, said bottom of the mounting groove being provided with a second groove for mounting the beads of the tread-bearing bearing support.

11. The rim according to claim 2, wherein the seats for the tire beads have unequal diameters.

12. The rim according to claim 11, wherein the rim has no mounting groove for the tire beads.

13. The rim according to claim 11, wherein the seats for the beads of the tread-bearing bearing support have unequal diameters, and the difference between the diameters of the seats for the tread-bearing support beads being equal to the difference between the diameters of the seats for the tire beads.

14. A rolling assembly comprising a tire having a pair of beads, an inflated tread bearing support having at least two beads, and a mounting rim, said mounting rim comprising on each side of the equatorial plane of the rim a rim seat, for receipt of one of said tire beads, inclined axially outwardly and radially inwardly and extended axially outwards by a projection or hump, wherein the rim further comprises on each side of the equatorial plane, axially inwardly between each tire bead rim seat and the equatorial plane, at least one truncated conical seat inclined inwards at an angle greater than 0° with a line parallel to the axis of rotation and designed to receive a bead of the tread-bearing support.

15. The rolling assembly according to claim 14, wherein the tread-bearing support is a toric membrane made of rubber impermeable to the usual inflation gases and inflated to a given pressure, provided with a cap radially covering a crown reinforcement, said cap being connected by two supporting sidewalls to said at least two beads, each bead being reinforced by an annular element designed to ensure the necessary tightness on the conical seats for the beads of the tread-bearing support.

16. The rolling assembly according to claim 15, wherein the crown reinforcement of the toric membrane is a hoop reinforcement comprising at least one ply of circumferential reinforcement elements, and the toxic membrane is used with an inflation pressure between 2 and 5 times the tire inflation pressure of between 1 and 2 bar, and retains its shape and pressure when the tire is punctured with partial or total loss of pressure.

17. The rolling assembly according to claim 15, wherein the crown reinforcement of the toric membrane is a hoop reinforcement whose circumferential reinforcement elements rupture under a given tension higher than the sum of the tension produced by the centrifugal force to which the toric membrane may be subjected and the tension produced by a difference of inflation pressures of the order of 1 bar between the internal cavity of the toric membrane and the internal cavity of the tire, and in the event that pressure in the tire cavity is lost, the membrane swells and expands circumferentially to fill the internal space initially occupied by the tire.

* * * * *